(12) United States Patent
Tsai

(10) Patent No.: US 7,375,645 B2
(45) Date of Patent: May 20, 2008

(54) PORTABLE ELECTRONIC DEVICE WITH AN IMPACT-DETECTING FUNCTION

(75) Inventor: Teng-Yi Tsai, Taipei Hsien (TW)

(73) Assignee: BenQ Corporation, Gueishan, Tao-Yuan, Hsien (TW)

( * ) Notice: Subject to any disclaimer, the term of this patent is extended or adjusted under 35 U.S.C. 154(b) by 260 days.

(21) Appl. No.: 11/164,398

(22) Filed: Nov. 21, 2005

(65) Prior Publication Data

US 2006/0229055 A1    Oct. 12, 2006

(30) Foreign Application Priority Data

Feb. 4, 2005    (TW) .............................. 94103655 A

(51) Int. Cl.
*G08B 21/00*    (2006.01)
(52) U.S. Cl. ........................................ 340/665; 340/689
(58) Field of Classification Search ................ 340/665, 340/440, 429, 545.5, 566, 568.1, 689; 455/410
See application file for complete search history.

(56) References Cited

U.S. PATENT DOCUMENTS

| 4,542,337 | A  | * | 9/1985  | Rausch ..................... 340/568.1 |
| 4,942,386 | A  | * | 7/1990  | Willis ......................... 340/566 |
| 5,623,248 | A  | * | 4/1997  | Min ............................ 340/566 |
| 6,206,187 | B1 | * | 3/2001  | Van Winkle ................ 206/320 |
| 6,483,436 | B1 | * | 11/2002 | Emaci et al. ............. 340/686.1 |
| 6,771,449 | B1 | * | 8/2004  | Ito et al. ........................ 360/75 |
| 7,059,182 | B1 | * | 6/2006  | Ragner ......................... 73/200 |
| 7,180,417 | B2 | * | 2/2007  | Matoba et al. ........... 340/568.1 |
| 7,202,785 | B2 | * | 4/2007  | Maloney .................. 340/568.1 |

* cited by examiner

*Primary Examiner*—John Tweel, Jr.
(74) *Attorney, Agent, or Firm*—Winston Hsu

(57) ABSTRACT

A portable electronic device includes a housing, and a fragment mechanism installed inside the housing. The fragment mechanism includes a first fragment, and a second fragment pressing against the first fragment. The first fragment is capable of being separated from the second fragment when an impulsive force greater than a critical impulsive force is applied to the portable electronic device.

13 Claims, 7 Drawing Sheets

PORTABLE ELECTRONIC DEVICE WITH AN IMPACT-DETECTING FUNCTION

BACKGROUND OF THE INVENTION

1. Field of the Invention

The present invention relates to a portable electronic device with an impact-detecting function, and more particularly, to a portable electronic device utilizing a fragment mechanism to detect impact level.

2. Description of the Prior Art

In highly developed information communication systems in the modern information society, electronic devices are widely utilized in every area. For instance, the utilization of a convenient and lightweight mobile phone device has become a way of communication in our daily life; users can easily exchange and share information, experiences, and opinions through the convenience of the mobile phone device. In regard to the impact protection or drop protection of consumer electronic products, most drop test standards follow real usage scenarios for the products to be tested. However it is not always easy to predict all usage patterns of products by consumers. For instance, a warranty does not cover damage caused by artificial factors, such as throwing down mobile phones. But for now it is difficult to determine if the impulsive force applied to the mobile phone is over the limited load, and it is therefore difficult to determine who is responsible for the repairs. There is a need to get information of usage status of a product from the product itself so that the responsibility for repairing can be decided according to whether the product has been under an over-loading situation.

SUMMARY OF THE INVENTION

It is therefore a primary objective of the claimed invention to provide a portable electronic device with an impact-detecting function for solving the above-mentioned problem.

According to the claimed invention, a portable electronic device includes a housing, and a fragment mechanism installed inside the housing. The fragment mechanism includes a first fragment, and a second fragment pressing against the first fragment. The first fragment is capable of being separated from the second fragment when an impulsive force greater than a critical impulsive force is applied to the portable electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
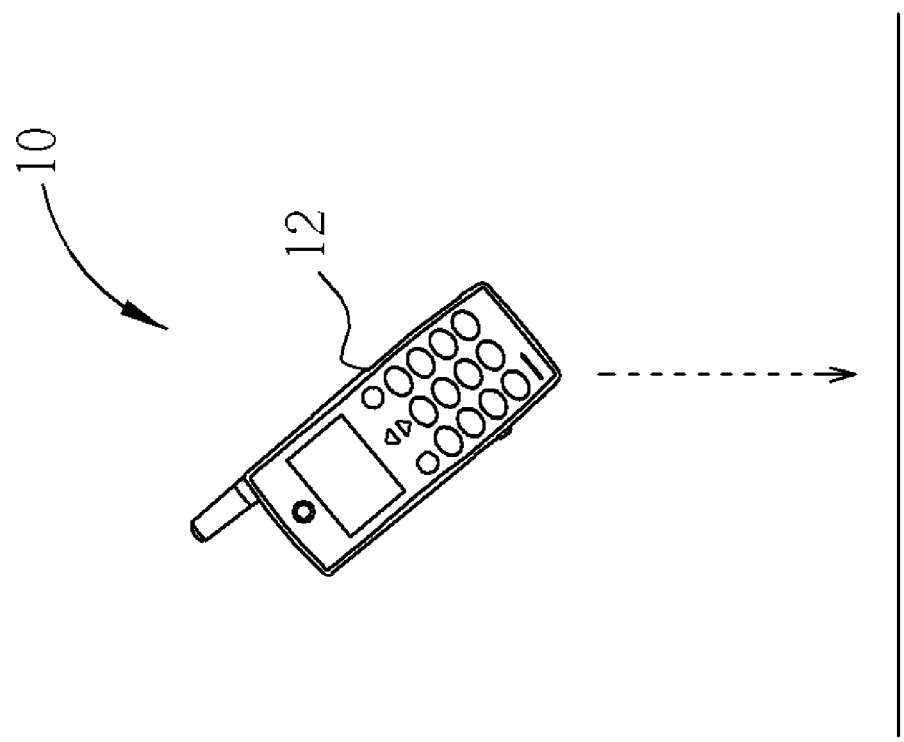
FIG. 1 is a diagram of a portable electronic device falling according to the present invention.

Please refer to FIG. 1. FIG. 1 is a diagram of a portable electronic device 10 falling according to the present invention. The portable electronic device 10 can be a mobile phone, a personal digital assistant (PDA), and so on. The portable electronic device 10 includes a housing 12 for covering internal components of the portable electronic device 10 so as to prevent the internal components from damage when the portable electronic device 10 falls.

Figure 2:
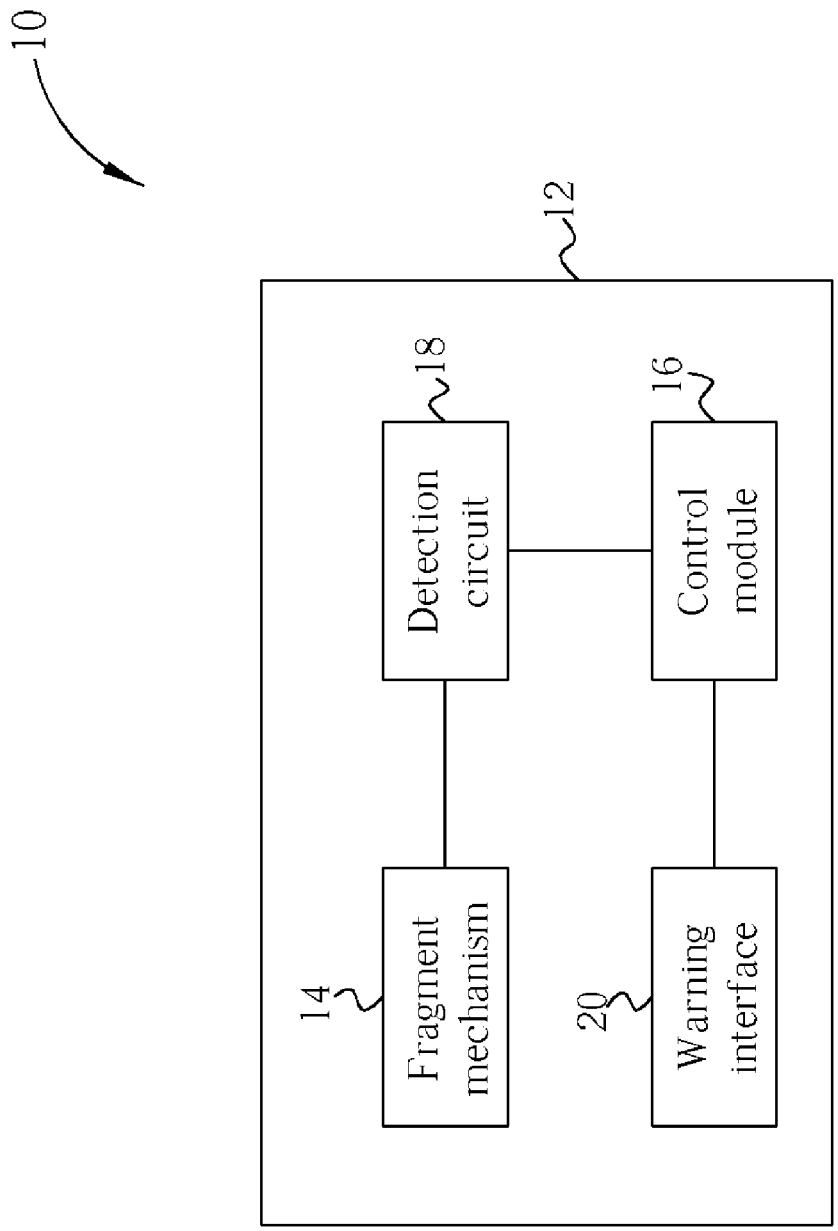
FIG. 2 is a functional block diagram of the portable electronic device in FIG. 1 according to the present invention.

Please refer to FIG. 2. FIG. 2 is a functional block diagram of the portable electronic device 10 according to the present invention. The portable electronic device 10 includes a fragment mechanism 14 installed inside the housing 12, a control module 16 installed inside the housing 12 for controlling operation of the portable electronic device 10, a detection circuit 18 installed inside the housing 12 and coupled to the control module 16 for outputting a detection signal to the control module 16, and a warning interface 20 coupled to the control module 16. The control module 16 controls the warning interface 20 to present a warning message when the control module 16 receives a separation detection signal from the detection circuit 18. The warning interface 20 can be a display module, such as an LCD monitor.

Figure 3:
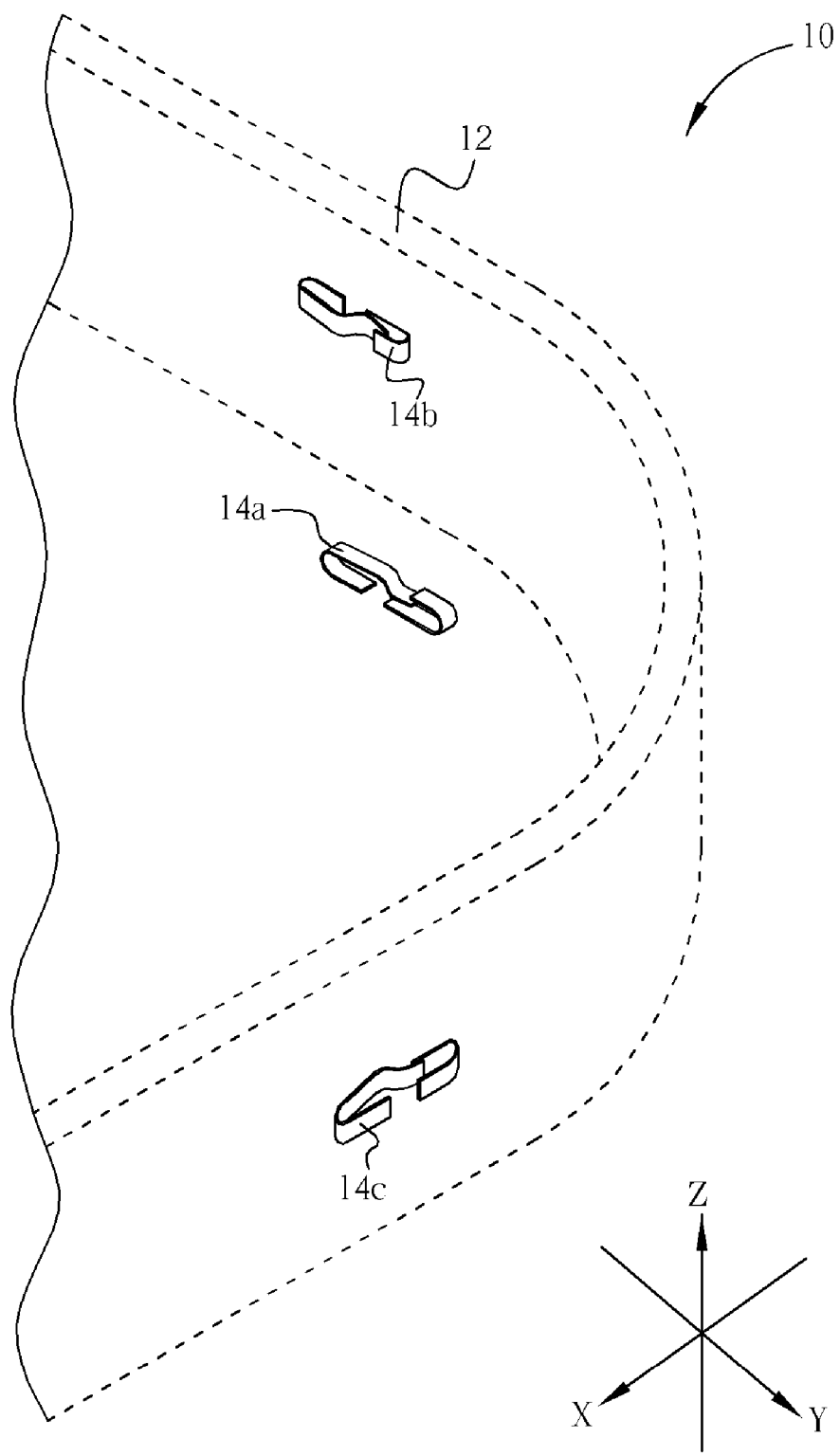
FIG. 3 is a diagram of a fragment mechanism installed on an inner surface of a housing according to the present invention.

Please refer to FIG. 3. FIG. 3 is a diagram of the fragment mechanism 14 installed on an inner surface of the housing 12 according to the present invention. The location of the fragment mechanism 14 depends on the direction of the impact detection. For instance, when the fragment mechanism 14a is positioned on the upper or lower side of the housing 12, the fragment mechanism 14a can be used for detecting impact level in Z direction of the portable electronic device 10. When the fragment mechanism 14b is positioned on the lateral side of the housing 12, the fragment mechanism 14b can be used for detecting impact level in X direction of the portable electronic device 10. When the fragment mechanism 14c is positioned to the front or rear side of the housing 12, the fragment mechanism 14c can be used for detecting impact level in Y direction of the portable electronic device 10. The location and the number of the fragment mechanism 14 installed inside the housing 12 depends on the design demand, and is not limited to the examples mentioned above. The fragment mechanism 14 can be connected to the inner surface of the housing 12 with a surface mounting technique, as a monolithic structure, by wedging in the inner surface of the housing, or with a thermit welding method. The fragment mechanism 14 also can be connected to structures other than the housing 12 structure.

Figure 4:
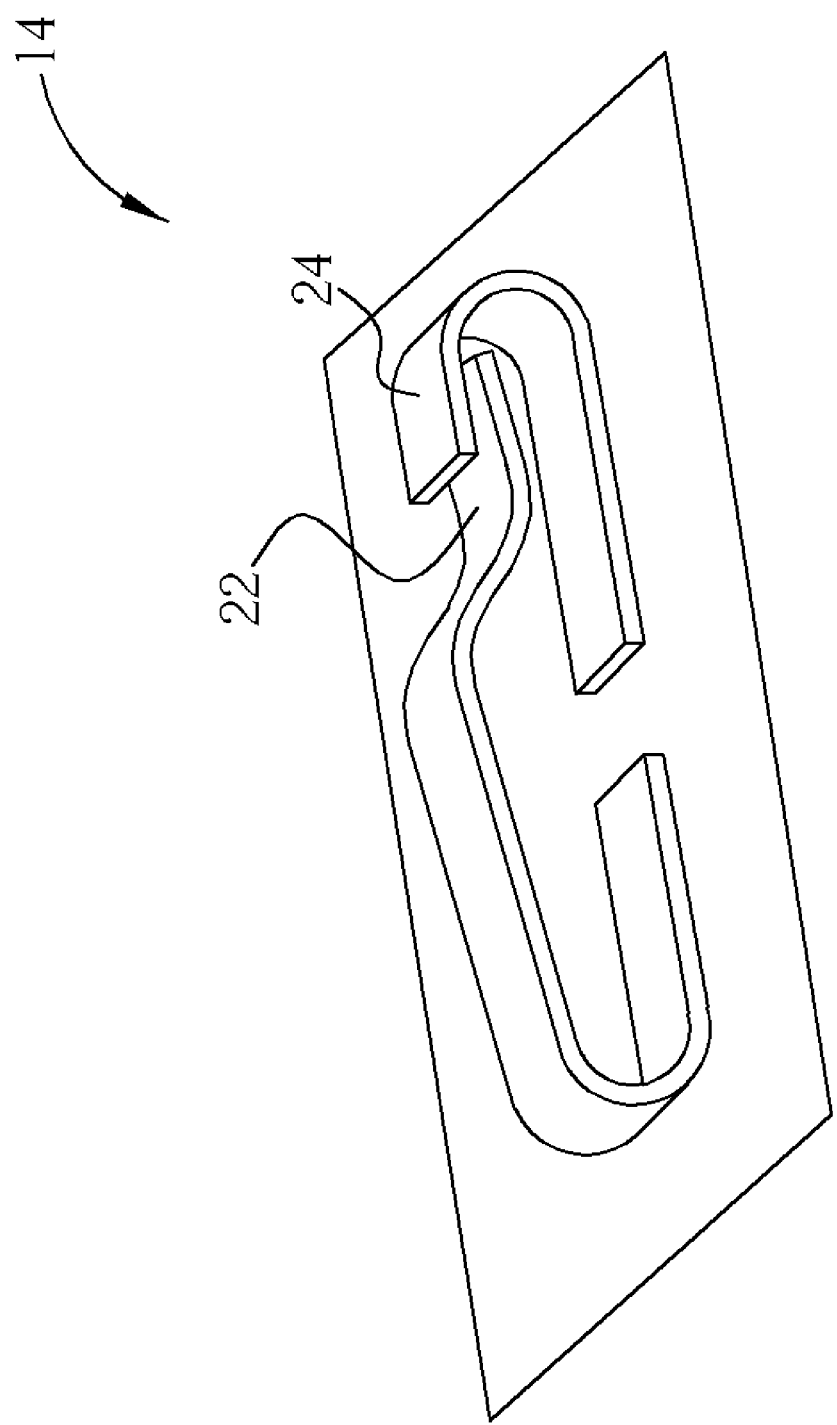
FIG. 4 is a diagram of the fragment mechanism in an original state or under a situation that no impulsive force greater than a critical impulsive force applied to the portable electronic device has occurred according to the present invention.
Figure 5:
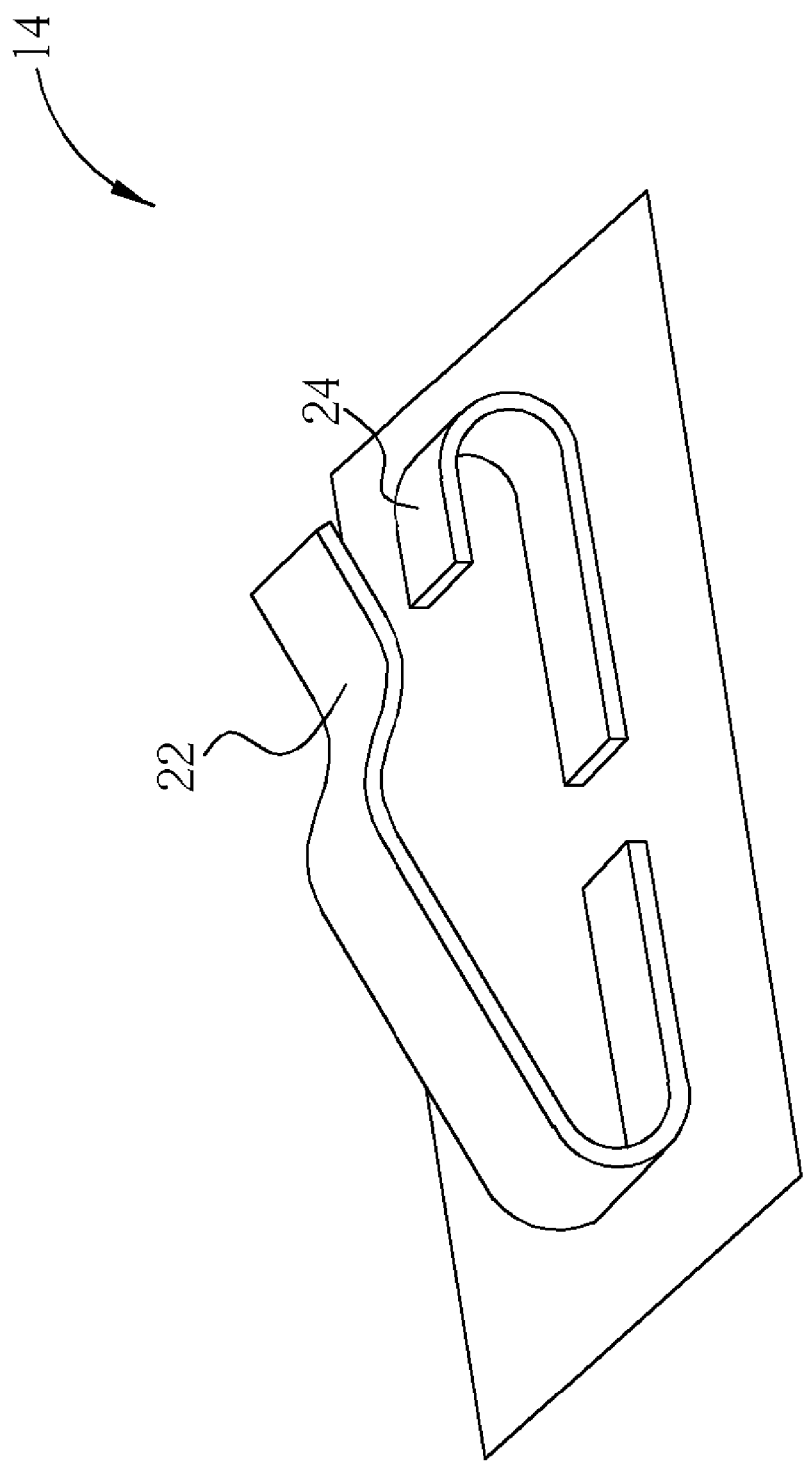
FIG. 5 is a diagram of the fragment mechanism under a situation that an impulsive force greater than a critical impulsive force applied to the portable electronic device has occurred according to the present invention.

Please refer to FIG. 4 and FIG. 5. FIG. 4 is a diagram of the fragment mechanism 14 in an original state or under a situation where no impulsive force greater than a critical impulsive force applied to the portable electronic device 10 has occurred according to the present invention. FIG. 5 is a diagram of the fragment mechanism 14 under a situation where an impulsive force greater than a critical impulsive force applied to the portable electronic device 10 has occurred according to the present invention. As shown in FIG. 4, the fragment mechanism 14 includes a first fragment 22, and a second fragment 24 pressing against the first fragment 22. The first fragment 22 and the second fragment 24 may be made of metal. When the portable electronic device 10 falls and hits the ground, the portable electronic device 10 experiences an sudden impulsive force due to the impact of the portable electronic device 10 with the ground. The impulsive force might cause damages to the portable electronic device 10, such as appearance or structural breakage. The first fragment 22 and the second fragment 24 separate when the impulsive force is greater than a critical impulsive force. As shown in FIG. 5, the first fragment 22 is capable of being separated from the bottom of the second fragment 24 when a magnitude of an impulsive force applied to the portable electronic device 10 is greater than a critical impulsive value. That is, when the impulsive force applied to the portable electronic device 10 is too large, there would be a relative movement between the first fragment 22 and the second fragment 24. Whether an over-loading impact is applied to the portable electronic device 10 can be determined according to the relative position between first fragment 22 and the second fragment 24 so that the manufacturer can determine the repair responsibility.

For example, during a drop test a mobile phone falls from a height of 1.5 meters to the ground, the period of the mobile phone contacting with the ground is about 0.1 second, and the coefficient of restitution of the mobile phone and the ground is 0.5. The transformation of the energy and the momentum change is as follows: (wherein $\Delta t$=0.1 (sec), the weight of the mobile phone, m,=0.1 (kg), $\Delta h$=1.5(m))

$$F*\Delta t = m*\Delta V (V=(2gh)^{0.5}, g=9.8 \text{ m/s}^2)$$

$$F*0.1 = 0.1 \ ((2gh)^{0.5}*0.5 + (2gh)^{0.5})$$

$$F*0.1 = 0.1 \ ((2*9.8*1.5)^{0.5}*0.5 + (2*9.8*1.5)^{0.5})$$

$$F \approx 8.13(N)$$

That is, under the above-mentioned condition the impulsive force of the mobile phone is about 8.13 nt. The separation force of the first fragment 22 and the second fragment 24 of the fragment mechanism 14 can be set to 8.13 nt (a critical impulsive value). When the falling height of the portable electronic device 10 increases and other conditions are the same, an impulsive force greater than the critical impulsive value (8.13 nt) is applied to the portable electronic device 10 so that the first fragment 22 separates from the bottom of the second fragment 24. This provides evidence that the impulsive force due to falling down is greater than the standard value of the drop test so that the portable electronic device 10 is damaged due to artificial factors.

Figure 6:
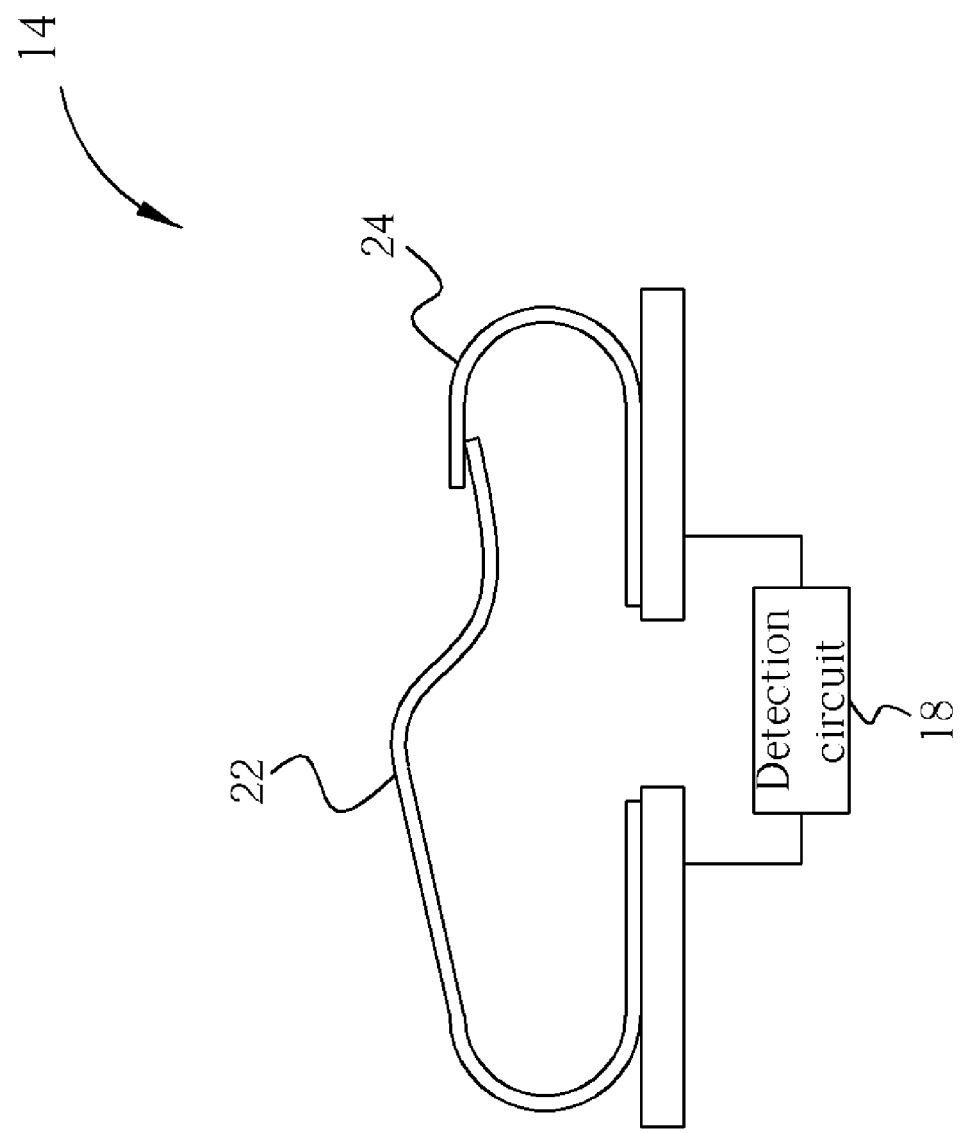
FIG. 6 is a diagram of the first fragment being pressed by the second fragment shown in FIG. 4 so that the detection circuit is closed.
Figure 7:
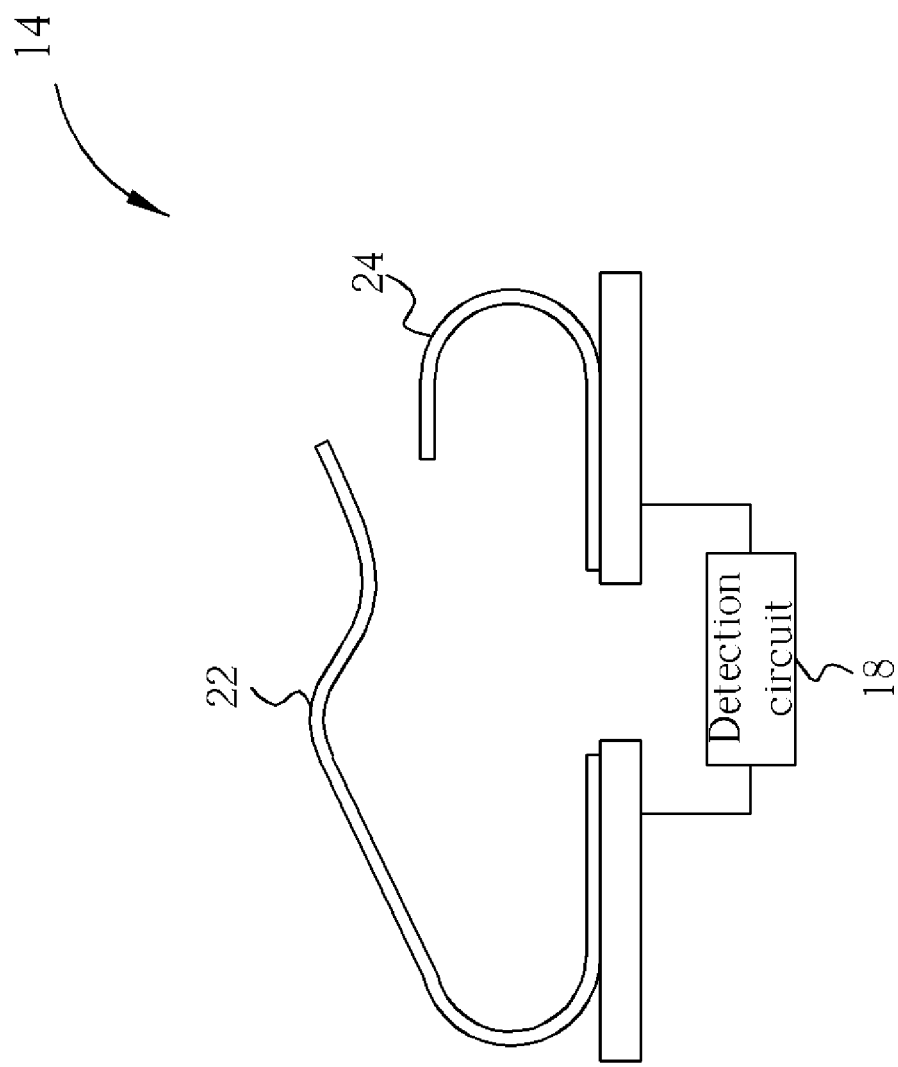
FIG. 7 is a diagram of the first fragment being separated from the second fragment shown in FIG. 5 so that the detection circuit is open.

In addition, a circuit can be applied in the present invention to inform users whether the first fragment 22 and the second fragment 24 are separated. Please refer to FIG. 6 and FIG. 7. FIG. 6 is a diagram of the first fragment mechanism 22 being pressed by the second fragment 24 shown in FIG. 4 so that the detection circuit 18 is closed. FIG. 7 is a diagram of the first fragment 22 separated from the second fragment 24 shown in FIG. 5 so that the detection circuit 18 is open. The first fragment 22 and the second fragment 24 are connected to the detection circuit 18 electrically. When no impulsive force greater than the critical impulsive force is applied to the portable electronic device 10, that is, the first fragment 22 does not separate from the second fragment 24, the first fragment 22 maintains contact with the second fragment 24 so that the detection circuit 18 is closed and the detection circuit 18 does not output any signal to the control module 16. When an impulsive force greater than the critical impulsive force is applied to the portable electronic device 10, the first fragment 22 separates from the second fragment 24 so that the detection circuit 18 is open and outputs a separation detection signal to the control module 16. When the control module 16 receives the separation detection signal from the detection circuit 18, the control module 16 controls the warning interface 20 to present a warning message. For instance, the warning interface 20 can be a display module, such as an LCD monitor, or a speaker to remind users that the portable electronic device 10 might be damaged and need to be repaired. In addition, when the control module 16 receives the separation detection signal from the detection circuit 18, the control module 16 also can store the impulsive information in a storage module (not shown in figures) of the portable electronic device 10 to provide evidence for repair responsibility.

In contrast to the conventional portable electronic device, the portable electronic device according to present invention utilizes a fragment mechanism to detect impact levels. That is, when no impulsive force greater than the critical impulsive force is applied to the portable electronic device, the two fragments are not separated; and when there is an impulsive force greater than the critical impulsive force applied to the portable electronic device, the two fragments are separated. Hence whether an impulsive force greater than the critical impulsive force is applied to the portable electronic device can be determined by the relative position of two fragments or the conductivity of the circuit so that the responsibility for repairing can be decided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable handheld electronic device comprising:
   a housing; and
   a fragment mechanism installed inside the housing, the fragment mechanism comprising:
   a first fragment; and
   a second fragment pressing against the first fragment;
   wherein the first fragment is capable of separating from a bottom of the second fragment when an impulsive force greater than a critical impulsive force is applied to the portable handheld electronic device.

2. The portable handheld electronic device of claim 1 further comprising a control module installed inside the housing for controlling operation of the portable handheld electronic device, and a detection circuit installed inside the housing and coupled to the control module for outputting a detection signal to the control module according to whether the first fragment contacts with the second fragment.

3. The portable handheld electronic device of claim 2 wherein the detection circuit is capable of outputting a separation detection signal to the control module when the first fragment separates from the second fragment.

4. The portable handheld electronic device of claim 3 further comprising a warning interface coupled to the control module wherein the control module controls the warning interface to present a warning message when the control module receives the separation detection signal from the detection circuit.

5. The portable handheld electronic device of claim 4 wherein the warning interface is a display module.

6. The portable handheld electronic device of claim 1 wherein the first fragment and the second fragment are made of metal.

7. The portable handheld electronic device of claim 1 wherein the fragment mechanism is connected to the inner surface of the housing.

8. The portable handheld electronic device of claim 7 wherein the fragment mechanism is connected to the inner surface of the housing with a surface mounting technique.

9. The portable handheld electronic device of claim 7 wherein the fragment mechanism is connected with the inner surface of the housing as a monolithic structure.

10. The portable handheld electronic device of claim 7 wherein the fragment mechanism is wedged in the inner surface of the housing.

11. The portable handheld electronic device of claim 7 wherein the fragment mechanism is attached to the inner surface of the housing by a thermit welding method.

12. The portable handheld electronic device of claim 1 being a mobile phone.

13. The portable handheld electronic device of claim 1 being a personal digital assistant (PDA).

* * * * *